(12) United States Patent
Nomura et al.

(10) Patent No.: US 6,335,834 B1
(45) Date of Patent: Jan. 1, 2002

(54) BARREL HAVING CAM GROOVE AND HELICOID

(75) Inventors: Hiroshi Nomura, Saitama; Kazunori Ishizuka, Kanagawa, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/692,615

(22) Filed: Oct. 20, 2000

(30) Foreign Application Priority Data

Oct. 21, 1999 (JP) .................................................. 11-299846

(51) Int. Cl.[7] .................................................. G02B 15/14
(52) U.S. Cl. ............................................ 359/700; 359/701
(58) Field of Search ...................................... 359/694, 700, 359/701, 825

(56) References Cited

U.S. PATENT DOCUMENTS

| | | | |
|---|---|---|---|
| 5,446,593 A | 8/1995 | Hamasaki et al. ............ | 359/704 |
| 5,467,227 A | 11/1995 | Nomura ......................... | 359/694 |
| 5,488,513 A | 1/1996 | Tanaka .......................... | 359/699 |
| 5,701,206 A | 12/1997 | Sasaki et al. ................. | 359/704 |
| 5,912,772 A | 6/1999 | Aoki ............................... | 359/701 |
| 5,966,249 A | 10/1999 | Aoki ............................... | 359/699 |
| 6,115,189 A | 9/2000 | Nomura et al. ............... | 359/694 |

*Primary Examiner*—Ricky Mack
(74) *Attorney, Agent, or Firm*—Greenblum & Bernstein, P.L.C.

(57) ABSTRACT

A barrel is provided, having at least one cam groove and a helicoid on one and the other of outer and inner peripheral surfaces of the barrel, respectively; wherein a wall thickness of the barrel corresponds to the sum of a height of teeth of the helicoid and a depth of the cam groove, so that the cam groove forms through-holes in the wall of the barrel where no teeth exist.

10 Claims, 3 Drawing Sheets

BARREL HAVING CAM GROOVE AND HELICOID

BACKGROUND OF THE INVENTION

1. Field of the Invention

The present invention relates to a barrel provided as an element of a zoom lens and having one or more than one cam groove on one of the outer and inner peripheral surfaces of the barrel and a helicoid on the other peripheral surface of the barrel.

2. Description of the Related Art

In order to design a compact zoom lens and/or reduce the number of elements of a zoom lens, it is often the case that more than one function is given to an element of the zoom lens. For instance, the zoom lens is provided therein with a barrel having one or more than one cam groove on one of the outer and inner peripheral surfaces of the barrel and a helicoid (helicoidal threaded portion) on the other peripheral surface of the barrel. However, the wall thickness (i.e., the radial thickness of the cylindrical wall) of such a conventional barrel is generally large to maintain a sufficient strength thereof, which makes it difficult to reduce the diameter of the barrel.

SUMMARY OF THE INVENTION

The present invention has been made in view of the problem noted above, wherein an object of the present invention is to provide a barrel which can be used as an element of a zoom lens which makes it possible to reduce the diameter of the barrel while maintaining a sufficient strength thereof.

To achieve the object mentioned above, according to an aspect of the present invention, a barrel is provided, including at least one cam groove and a helicoid on one and the other of outer and inner peripheral surfaces of the barrel, respectively; wherein a wall thickness of the barrel corresponds to the sum of a height of teeth of the helicoid and a depth of the cam groove, so that the cam groove forms through-holes in the wall of the barrel where no teeth exist.

With this structure, the barrel can be made small because through-holes are formed on the barrel along the cam groove or grooves therein, while part of the barrel around the cam groove or grooves can be reinforced by the teeth of the helicoid to thereby ensure the strength of the barrel.

Preferably, the teeth of the helicoid extend in an inclination direction different to an inclination direction of the cam groove with respect to an axis of the barrel.

Preferably, the cam groove is formed so that the width thereof gradually decreases in a radial and outward direction of the barrel.

Preferably, a plurality of cam grooves having different profiles are provided on the barrel.

Preferably, the teeth of the helicoid are formed integral with the barrel.

In an embodiment, the cam groove and the helicoid are formed on the inner peripheral surface of the barrel and the outer peripheral surface of the barrel, respectively.

Preferably, the barrel is provided as an element of a zoom lens.

According to another aspect of the present invention, a barrel is provided, including at least one cam and a helicoid on one and the other of outer and inner peripheral surfaces of the barrel, respectively; wherein the cam is formed as a cam slot which forms through-holes in the barrel in a radial direction of the barrel, and wherein teeth of the helicoid are connected to the cam slot so as to partly cover an outer opening of the cam slot.

According to another aspect of the present invention a barrel is provided, including at least one cam groove formed on one of outer and inner peripheral surfaces of the barrel; and a helicoid formed on the other of the outer and inner peripheral surfaces of the barrel, wherein teeth of the helicoid extend in an inclination direction different to that of the cam groove with respect to an axis of the barrel, and wherein the cam groove is formed so as to form through-holes in the barrel where the teeth of the helicoid do not overlap the cam groove.

According to another aspect of the present invention, a zoom lens is provided, including an outer barrel provided on an inner peripheral surface thereof with a female helicoid; an inner barrel provided on an outer peripheral surface thereof with a male helicoid, wherein a feed operation is carried out in accordance with the engagement of the male and female helicoids; and at least one cam groove formed on an inner peripheral surface of the inner barrel, wherein teeth of the male helicoid extend in an inclination direction different to an inclination direction of the cam groove with respect to an axis of the barrel, and the cam groove is formed so as to form through-holes in the barrel where teeth of the male helicoid do not overlap the cam groove.

The present disclosure relates to subject matter contained in Japanese Patent Application No.11-299846 (filed on Oct. 21, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
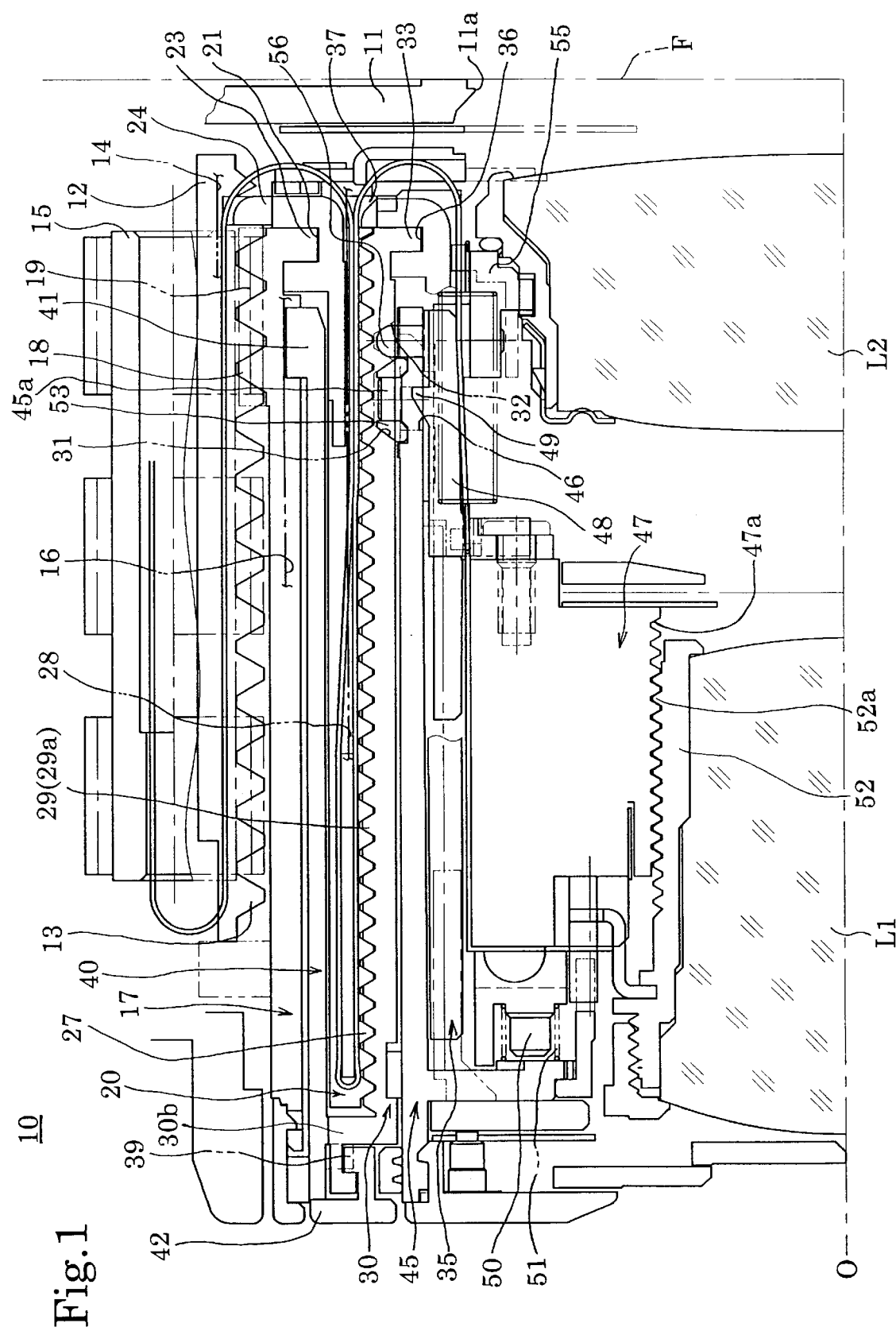
FIG. 1 is an axial cross sectional view of a zoom lens incorporated in a zoom compact camera having a cam/helicoid barrel to which the present invention is applied, showing the zoom lens above an optical axis in an accommodated state.

A zoom lens (zoom lens barrel) 10 shown in FIG. 1 is incorporated in a zoom compact camera. The zoom lens 10 is a three-stage delivery type (telescoping type) having three extending barrels; namely, an outer extending barrel (first rotary moving barrel) 17, a middle extending barrel (second rotary moving barrel) 40 and an inner extending barrel (linear moving barrel) 45 which are concentrically arranged about an optical axis O. In the zoom lens 10, two lens groups are provided as a photographic optical system; namely, a front lens group L1 and a rear lens group L2. The zoom lens 10 performs zooming by changing the space between the first and second lens groups L1 and L2 and at the same time changing the distance between each of the first and second lens groups L1 and L2 and a film surface F. The zoom lens 10 effects a focusing operation by moving the first lens group L1 along the optical axis O to bring a subject into focus. The overall structure and operation of the zoom lens 10 will be hereinafter discussed with reference to FIG. 1.

A camera body of the zoom compact camera is provided therein with an aperture plate 11 having a rectangular aperture 11a which forms the limits of each frame exposed. A stationary helicoid barrel 12 is secured to the front face of the aperture plate 11. The stationary helicoid barrel 12 is provided on the inner peripheral surface thereof with a female helicoid 13 and a plurality of linear guide grooves 14 (only one of which is shown by a phantom line in FIG. 1.) extending parallel to an optical axis O of the zoom lens 10, i.e., extending in the optical axis direction. The stationary helicoid barrel 12 is provided with a slot (not shown) extending in the optical axis direction. The zoom lens 10 is provided therein with a zoom gear 15 that extends in the optical axis direction. Part of the teeth of the zoom gear 15 is positioned inside the stationary helicoid barrel 12 via the aforementioned slot. The zoom gear 15 is driven by a zoom motor (not shown).

The outer extending barrel 17 is provided, on the outer peripheral surface of the outer extending barrel 17 in the vicinity of the rear end thereof, with a male helicoid 18 and an outer peripheral gear 19 which extend along a common circumference of the outer extending barrel 17. The female helicoid 13 of the stationary helicoid barrel 12 meshes with the male helicoid 18. The teeth of the outer peripheral gear 19 meshes with the zoom gear 15. The zoom gear 15 is driven by the zoom motor to give rotational force to the outer extending barrel 17 via the outer peripheral gear 19. The outer extending barrel 17 is provided on the inner peripheral surface thereof with a plurality of rotation transmission grooves 16 (only one of which is shown by a phantom line in FIG. 1) extending in the optical axis direction.

The zoom lens 10 is provided inside the outer extending barrel 17 with a first linear movement guide ring 20. The first linear movement guide ring 20 is provided, on the outer peripheral surface of the first linear movement guide ring 20 in the vicinity of the rear end thereof, with a circumferential annular groove 21 whose center is located on the optical axis O. The outer extending barrel 17 is provided, on the inner peripheral surface of the outer extending barrel 17 at the rear end thereof, with a plurality of engaging projections 23 (only one of which is shown in FIG. 1). The engaging projections 23 are fitted in the annular groove 21 of the first linear movement guide ring 20 to be slidable therealong without moving in the optical axis direction relative to the circumferential groove 21. Due to this engagement of the engaging projections 23 with the annular groove 21, the outer extending barrel 17 can rotate about the optical axis O relative to the first linear movement guide ring 20 but cannot move in the optical axis direction relative to the first linear movement guide ring 20.

The first linear movement guide ring 20 is provided, on the inner peripheral surface of the first linear movement guide ring 20 at the rear end thereof, with a plurality of engaging projections 24 (only one of which is shown in FIG. 1) which extend radially to be slidably fitted in the corresponding plurality of linear guide grooves 14 of the stationary helicoid barrel 12. Due to this engagement of the engaging projections 24 with the linear guide grooves 14, the first linear movement guide ring 20 is guided in the optical axis direction without rotating relative to the stationary helicoid barrel 12.

The outer extending barrel 17 and the first linear movement guide ring 20 constitute a first feed stage (extension stage) of the zoom lens 10. In the first feed stage, when the zoom gear 15 is rotated in a predetermined direction by the zoom motor, the outer extending barrel 17 is rotated through the outer peripheral gear 19, so that the outer extending barrel 17 is advanced from the stationary helicoid barrel 12 in accordance with the relationship between the female helicoid 13 and the male helicoid 18. At the same time, the first linear movement guide ring 20 is moved together with the outer extending barrel 17 relative to the stationary helicoid barrel 12 in the optical axis direction while being linearly guided due to the engagement of the engaging projections 23 with the annular groove 21.

The first linear movement guide ring 20 is equipped on the inner peripheral surface thereof with a female helicoid (internal helicoid) 27 whose inclination direction is the same as that of the female helicoid 13. The first linear movement guide ring 20 is further provided on the inner peripheral surface thereof with a plurality of linear movement guide grooves 28 (only one of which is shown in FIG. 1) that extend in the optical axis direction.

Figure 2:
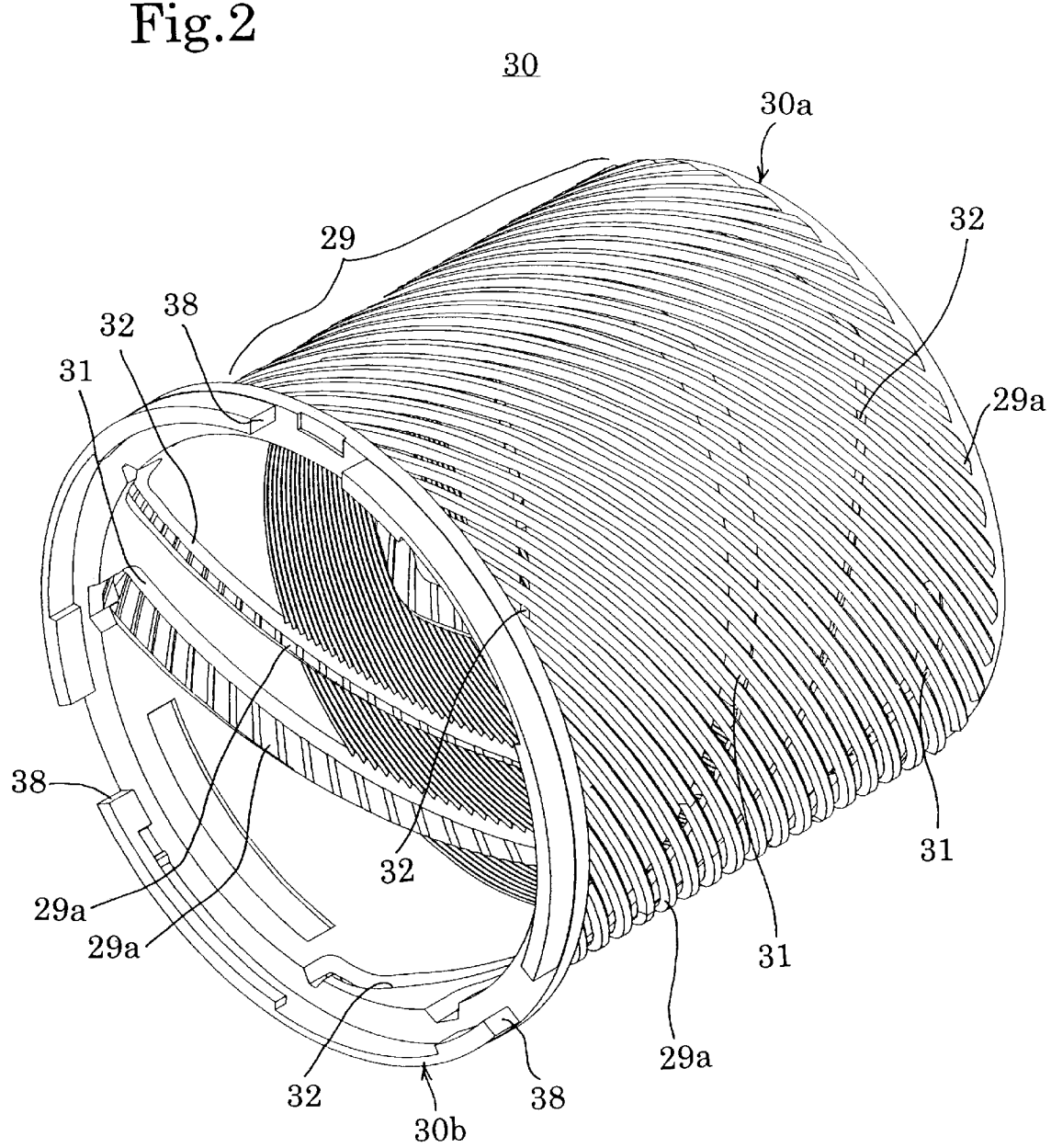
FIG. 2 is a perspective view of the cam/helicoid barrel provided in the zoom lens shown in FIG. 1.

The zoom lens 10 is provided inside the first linear movement guide ring 20 with a cam/helicoid barrel 30 (see also FIG. 2). The cam/helicoid barrel 30 is provided with a cylindrical portion 30a, a rib 30b fixed to the front end of the cylindrical portion 30a, and a male helicoid 29 which is formed entirely on the outer peripheral surface of the cylindrical portion 30a. The male helicoid 29 is made of a plurality of parallel teeth 29a fixed to the outer peripheral surface of the cylindrical portion 30a, so that the outer peripheral surface of the cylindrical portion 30a forms the bottom of thread of the male helicoid 29. The cylindrical portion 30a, the rib 30b and the parallel teeth 29a are formed integral with one another to form the cam/helicoid barrel 30.

The cam/helicoid barrel 30 is provided on the inner peripheral surface thereof with two types of cam grooves, e.g., first three cam grooves 31 and second three cam grooves 32. The inclination direction of each of the first and second cam grooves 31 and 32 is different to that of the teeth 29a of the male helicoid 29, i.e., is generally opposite to the inclination direction of the teeth 29a, with respect to the optical axis O. As shown in FIG. 1, each of the first and second cam grooves 31 and 32 has a trapezoidal cross section so that the width of each cam groove gradually decreases in a radial and outward direction, i.e., decreases with distance from the optical axis O. The features of the first and second cam grooves 31 and 32 will be discussed in detail later.

The cam/helicoid barrel 30 is also equipped, on the inner peripheral surface of the cam/helicoid barrel 30 at the rear end thereof, with a plurality of engaging projections 33 (only one of which is shown in FIG. 1) that protrude in the radial and inward direction (toward the optical axis O). The zoom lens 10 is provided inside the cam/helicoid barrel 30 with a second linear movement guide ring 35. The second linear movement guide ring 35 is provided, on the outer peripheral surface of the second linear movement guide ring 35 in the vicinity of the rear end thereof, with an annular groove 36 whose center is located on the optical axis O. The engaging projections 33 provided on the inner peripheral surface of the cam/helicoid barrel 30 are slidably fitted in the annular groove 36. Due to this engagement of the engaging projections 33 with the annular groove 36, the cam/helicoid barrel 30 and the second linear movement guide ring 35 are rotatably relatively connected so as not to relatively move in the optical axis direction.

The second linear movement guide ring 35 is provided at the rear end thereof with a plurality of linear movement guide projections 37 (only one of which is shown in FIG. 1) at different circumferential positions, that project outward in the radial direction. The linear movement guide projections 37 are slidably fitted in the aforementioned plurality of linear movement guide grooves 28, which are formed on the inner peripheral surface of the first linear movement guide ring 20. Consequently, the second linear movement guide ring 35 is guided in the optical axis direction without rotating relative to the stationary helicoid barrel 12.

The zoom lens 10 is provided between the outer extending barrel 17 and the first linear movement guide ring 20 with the middle extending barrel 40. The middle extending barrel 40 is provided, on the outer peripheral surface of the middle extending barrel 40 at the rear end thereof, with a plurality of rotation transmission projections 41 (only one of which is shown in FIG. 1) which are slidably fitted in the aforementioned plurality of rotation transmission grooves 16, which are formed on the inner peripheral surface of the outer extending barrel 17. Due to this engagement of the rotation transmission projections 41 with the rotation transmission grooves 16, the middle extending barrel 40 is guided in the optical axis direction relative to the outer extending barrel 17 without rotating about the optical axis O relative to the outer extending barrel 17.

The middle extending barrel 40 and the cam/helicoid barrel 30 are connected to each other at the front ends thereof so as not to rotate about and move along the optical axis O relative to each other. More specifically, the rib 30b of the cam/helicoid barrel 30 is provided with three cut-away portions 38 (see FIG. 2). The middle extending barrel 40 is equipped, on the inner peripheral surface of the middle extending barrel 40 at the front end thereof, with three engaging projections 39 that can be engaged with the cut-away portions 38 of the rib 30b and that are spaced from one another in a circumferential direction. The cam/helicoid barrel 30 and the middle extending barrel 40 are interconnected so as to move together in the optical axis direction and to rotate together about the optical axis O when the engaging projections 39 are engaged with the cut-away portions 38. A fixing ring 42 is fixed to the front end of the cam/helicoid barrel 30 so that the engaging projections 39 do not come off the cut-away portions 38.

Consequently, the middle extending barrel 40 is rotated in association with the outer extending barrel 17 to transmit the rotation to the cam/helicoid barrel 30, so that the cam/helicoid barrel 30 is extended from the first linear movement guide ring 20 while rotating about the optical axis O due to the engagement of the female helicoid 27 with the male helicoid 29.

The cam/helicoid barrel 30, the middle extending barrel 40 and the second linear movement guide ring 35 constitute a second feed stage (extension stage) of the zoom lens 10. When the outer extending barrel 17, which is an element of the first feed stage, is rotated and extended from the stationary helicoid barrel 12, the middle extending barrel 40 is rotated in association with the outer extending barrel 17 due to the engagement between the rotation transmission grooves 16 and the rotation transmission projections 41. The cam/helicoid barrel 30 to which the rotation of the middle extending barrel 40 is transmitted is advanced from the first linear movement guide ring 20 together with the middle extending barrel 40, while rotating relative to the stationary helicoid barrel 12 in the same direction as the outer extending barrel 17, in accordance with the engagement between the female helicoid 27 and the male helicoid 29. At the same time, the second linear movement guide ring 35 is moved in the optical axis direction together with the cam/helicoid barrel 30 while being guided by the first linear movement guide ring 20 in accordance with the engagement between the linear movement guide projections 37 and the linear movement guide grooves 28.

The zoom lens 10 is provided inside the cam/helicoid barrel 30 with the inner extending barrel 45. The inner extending barrel 45 is provided in the vicinity of the rear end thereof with a plurality of engaging holes 46 (only one of which is shown in FIG. 1). The zoom lens 10 is provided inside the inner extending barrel 45 with an AF/AE shutter unit 47. The shutter unit 47 is provided with a plurality of sliding plates 48 (only one of which is shown in FIG. 1) extending rearward in the optical axis direction. Each sliding plate 48 is provided thereon with a claw 49 (only one of which is shown in FIG. 1) which is engaged with a corresponding one of the engaging holes 46 of the inner extending barrel 45. The length of each engaging hole 46 in the optical axis direction is formed slightly greater than the length of each engaging claw 49 in the same direction. When the shutter unit 47 is fixed to the inner extending barrel 45 to be positioned therein, firstly a compression coil spring 51 is fitted on each of a plurality of projections 50 (only one of which is shown in FIG. 1) formed on the front face of the shutter unit 47, and subsequently, the engaging claws 49 are respectively engaged with the engaging holes 46 against the spring force of the compression coil springs 51. Due to the spring force of the compression coil springs 51, the shutter unit 47 is always biased rearward in the optical axis direction, so that the shutter unit 47 is kept at a constant position relative to the inner extending barrel 45 therein.

The second linear movement guide ring 35 is provided with a plurality of axially extending lens guide slits (not shown) which are formed by cutting away part of the peripheral surface thereof. The sliding plates 48 of the shutter unit 47 are slidably fitted in the lens guide slits, respectively, so that the inner extending barrel 45 and the shutter unit 47 can move linearly in the optical axis direction relative to the second linear movement guide ring 35 without rotating relative to the second linear movement guide ring 35.

The shutter unit 47 is provided with a threaded axial hole (internal thread) 47a with which an external thread 52a of the first lens frame 52 having the first lens group L1 is screw-engaged. The shutter unit 47 includes therein a focusing motor (not shown) which, during focusing, drives the first lens frame 52. If the focusing motor gives rotational force to the first lens group L1, the first lens group L1 moves in the optical axis direction while rotating about the optical axis O via the engagement between the internal thread 47a and the external thread 52a.

The inner extending barrel 45 is provided, on the outer peripheral surface of the inner extending barrel 45 in the vicinity of the rear end thereof, with three rollers 53 at different circumferential positions. These rollers 53 are slidably fitted in the aforementioned first cam grooves 31 of the cam/helicoid barrel 30, respectively. Each roller 53 is rotatably fitted on a corresponding axial pin 45a protruding from the inner extending barrel 45 in a radial and outward direction. Each roller 53 is shaped to correspond to the shape of the first cam groove 31. Namely, each roller 53 has a trapezoidal cross section so that the diameter gradually decreases in a radial and outward direction. Only one of the three rollers 53 appears in FIG. 1.

Figure 3:
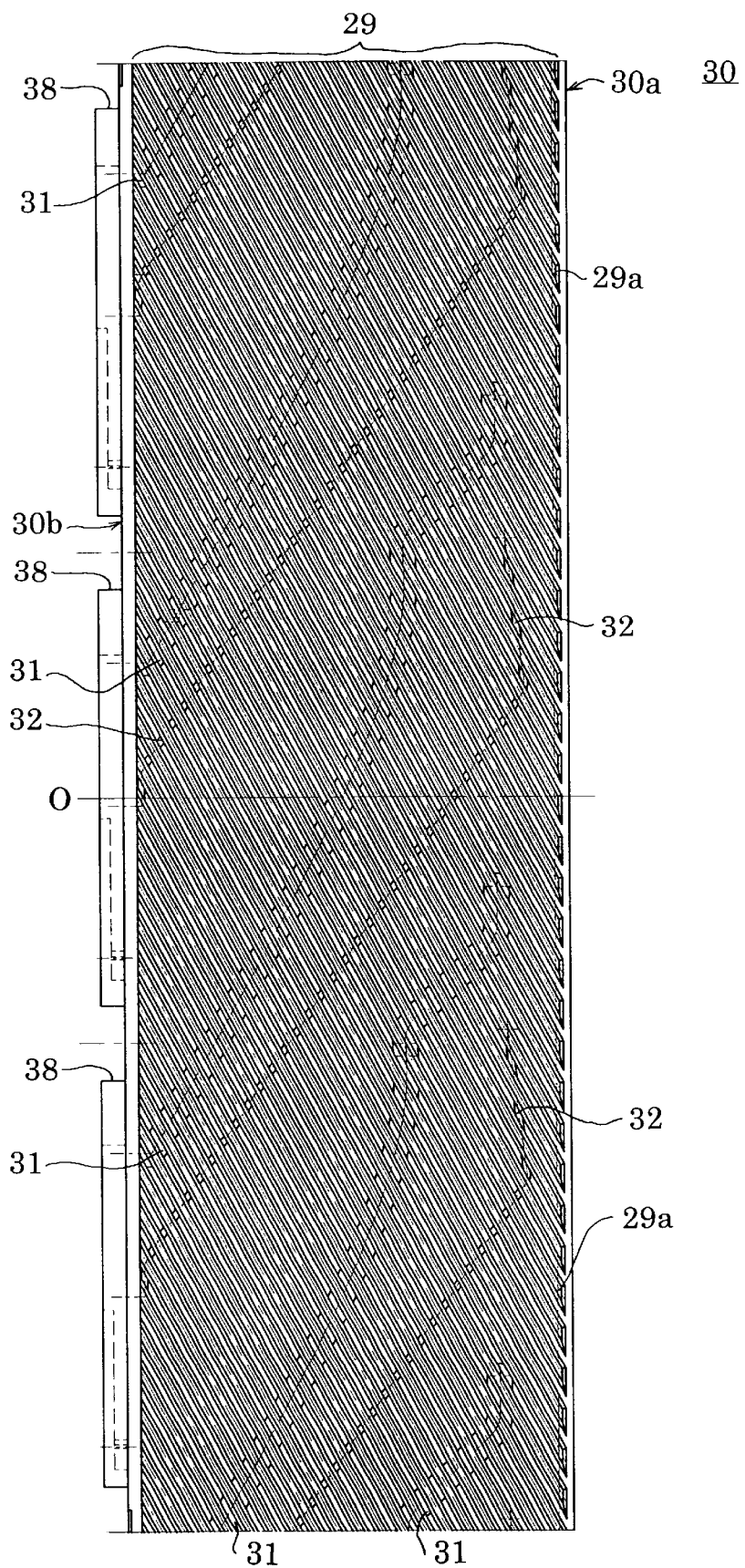
FIG. 3 is a developed view of the cam/helicoid barrel shown in FIG. 2.

As can be seen in FIG. 3, each cam groove 31 is inclined to the optical axis O. Since the inner extending barrel 45 and the shutter unit 47 are linearly guided in the optical axis direction by the second linear movement guide ring 35 via the plurality of sliding plates 48, when the rotation of the cam/helicoid barrel 30 takes place, the inner extending barrel 45 is moved relative to the cam/helicoid barrel 30 without rotating about the optical axis O in accordance with the profiles of the first cam grooves 31 in which the roller 53 are respectively fitted. Namely, the inner extending barrel 45 constitutes a third feed stage (extension stage) of the zoom lens 10. The first lens group L1 is also moved in the optical axis direction in accordance with the advancing or retracting movement of the inner extending barrel 45.

A second lens frame 55 which supports the second lens group L2 is linearly guided in the optical axis direction relative to the shutter unit 47. The second lens frame 55 is provided with three cam followers 56 at different circumferential positions so that each cam follower 56 projects in a radial and outward direction. Only one of the three cam followers 56 appears in FIG. 1. The three cam followers 56 are slidably fitted in the second three cam grooves 32, respectively. As can be seen in FIG. 3, each second cam groove 32 is inclined to the optical axis O. Since the second lens frame 55 is linearly guided in the optical axis direction via the shutter unit 47, when the rotation of the cam/helicoid barrel 30 takes place, the second lens group L2 is moved relative to the cam/helicoid barrel 30 without rotating about the optical axis O in accordance with the profiles of the second cam grooves 32 in which the cam followers 56 are respectively fitted.

Accordingly, when the rotation of the cam/helicoid barrel 30 takes place, the first and second lens groups L1 and L2 are relatively moved in the optical axis direction while changing the space therebetween in a predetermined manner in accordance with the profiles of the first and second cam grooves 31 and 32, respectively.

The zoom lens 10 operates as follows. If the zoom motor is driven in the extension direction of the zoom lens 10 from the retracted position (FIG. 1) or from the wide-angle extremity, the outer extending barrel 17 is rotated and advanced from the stationary helicoid barrel 12. Consequently, the first linear movement guide ring 20 is moved forward together with the outer extending barrel 17 while being linearly guided by the stationary helicoid barrel 12. As a result, the cam/helicoid barrel 30 is advanced together with the middle extending barrel 40 from the first linear movement guide ring 20 while rotating in the same direction as the outer extending barrel 17. At the same time, the linear movement of the second linear movement guide ring 35 in the optical axis direction together with the cam/helicoid barrel 30 occurs. When the cam/helicoid barrel 30 is advanced while rotating, the inner extending barrel 45 and the shutter unit 47 (which holds the first lens group L1) are advanced due to the engagement of the first cam grooves 31 with the roller 53. At the same time, the second lens group L2 is advanced due to the engagement of the second cam grooves 32 with the cam followers 56. The space between the first and second lens groups L1 and L2 in the optical axis direction is determined in accordance with the difference in profile between the first and second cam grooves 31 and 32. Upon a focal length being set by the above operations, the focusing motor is driven to adjust the axial position of the first lens group L1 to bring a subject into focus. If the zoom motor is driven in the retraction direction of the zoom lens 10 at the telephoto extremity, the zoom lens 10 operates in the opposite way to the above-mentioned operation.

The structure of the cam/helicoid barrel 30 will be hereinafter discussed in detail with reference to FIGS. 2 and 3. The cam/helicoid barrel 30 is provided on the outer peripheral surface thereof with the male helicoid 29 having parallel teeth 29a and is further provided on the inner peripheral surface thereof with the two types of cam grooves, i.e., the first cam grooves 31 and the second cam grooves 32, as mentioned above. The height of each of the first and second cam grooves 31 and 32 is determined to be equal to the wall thickness of the cylindrical portion 30a if the height of the parallel teeth 29a is neglected. Namely, if the height of the parallel teeth 29a is not taken into account, each of the first and second grooves 31 and 32 can be said to be formed as a cam slot on the cam/helicoid barrel 30 so as to penetrate through the cylindrical in a radial direction thereof.

On the other hand, the male helicoid 29 is formed in a manner such that the plurality of parallel teeth 29a protrude from the outer peripheral surface of the cylindrical portion 30a and that the bottom of teeth of the male helicoid 29 coincides with the outer peripheral surface of the cylindrical portion 30a. As shown in FIGS. 2 and 3, the teeth 29a of the male helicoid 29 are formed to extend in an inclination direction different (generally opposite) to that of each of the first and second cam grooves 31 and 32 with respect to the optical axis O, while the teeth 29a of the male helicoid 29 are formed continuously even at points where the teeth 29a overlap the first and second cam grooves 31 and 32. Therefore, at points where the first and second cam grooves 31 and 32, which are formed as cam slots that penetrate the cam/helicoid barrel 30 in radial directions, intersect the teeth 29a, the comb-like teeth 29a are connected to the first and second cam grooves (cam slots) 31 and 32 so as to partly cover the outer openings of the first and second cam grooves (cam slots) 31 and 32. In other words, each of the first and second cam grooves 31 and 32 is formed as an imperfect cam slot which penetrates the cam/helicoid barrel 30 at points other than the points where the teeth 29a overlap the first and second cam grooves 31 and 32. As shown in FIG. 1, each roller 53 and each cam follower 56, which are respectively slidably fitted in the corresponding first and second cam grooves 31 and 32, are designed to have a radial length so that the tip of each roller or cam follower does not interfere with the parallel teeth 29a. Therefore, each roller 53 and each cam follower 56 are never caught by gaps of the parallel teeth 29a when moving along the corresponding cam groove 31 or 32.

As for the cam/helicoid barrel 30, if the teeth 29a are regarded to form the bottoms of the first and second cam grooves 31 and 32, the bottoms of the first and second cam grooves 31 and 32 and the bottom of thread of the male helicoid 29 can be said to be positioned on the same cylindrical surface whose center is located on the optical axis O, i.e., the outer peripheral surface of the cylindrical portion. Due to this structure, the wall thickness of the cam/helicoid barrel 30 can be determined by the sum of the height of the teeth 29a of the male helicoid 29 and the depth of the first or second cam groove 31 or 32. In a conventional barrel having cam grooves on one of the outer and inner surfaces of the barrel and a helicoid on the other surface of the barrel, since the cam grooves are formed so as not to penetrate the barrel in radial directions, i.e., the cam grooves are not formed as cam slots, there is a substantial thickness between the bottom of each cam groove and the bottom of thread of the helicoid. This increases the wall thickness of the barrel. In contrast to this, according to the present embodiment of the cam/helicoid barrel 30, the wall thickness of the cam/helicoid barrel 30 can be made minimal, i.e., can be made to be equal to the sum of the height of the teeth of the male helicoid 29 and the depth of the cam groove 31 or 32, which contributes to miniaturizing the zoom lens 10.

Although the wall thickness of the present embodiment of the cam/helicoid barrel 30 is reduced, the strength of the cam/helicoid barrel 30 is successfully ensured. As mentioned, since the teeth 29a of the male helicoid 29 are formed continuously even at points where the teeth 29a overlap the first and second cam grooves 31 and 32, it can be said that the first and second cam grooves (cam slots) 31 and 32 are partly covered by the comb-like teeth 29a from the bottom as viewed from the inside of the cam/helicoid barrel 30. In other words, it can be said that small through-holes are intermittently formed on the cylindrical portion 30a along each of the first and second cam grooves 31 and 32 where no teeth 29a of the male helicoid 29 exist, as viewed from the outside of the cam/helicoid barrel 30. Accordingly, although the structure of the first and second cam grooves 31 and 32 which are made by making small through-holes intermittently on the cylindrical portion 30a contributes to reducing the wall thickness of the cam/helicoid barrel 30, the first and second cam grooves 31 and 32 are partly covered by the comb-like teeth 29a from the bottom, so that each of the first and second cam grooves 31 and 32 is formed as an imperfect cam slot. The teeth 29a also function to reinforce the cylindrical portion 30a around the first and second cam grooves 31 and 32. This makes it possible to design the cam/helicoid barrel 30 having sufficient strength.

In the above illustrated embodiment, since the teeth 29a of the male helicoid 29 are formed to extend in an inclination direction different to that of each of the first and second cam grooves 31 and 32 with respect to the optical axis O, the number of the teeth 29a of the male helicoid 29 is large while the length of each intersecting part between each tooth of the teeth 29a and each cam groove of the first and second cam grooves 31 and 32 is small. Therefore, the strength of the cam/helicoid barrel 30 is higher than that of a conventional cam/helicoid barrel wherein the teeth of a helicoid formed on one of the outer and inner peripheral surfaces of the barrel are formed to extend in the same inclination direction as cam grooves formed on the other peripheral surface of the barrel. Furthermore, since each of the cam grooves 31 and 32 has a trapezoidal cross section so that the width of each cam groove gradually decreases in a radial and outward direction, it is easier to strengthen the cam/helicoid barrel 30, especially an external layer thereof, due to a synergistic effect between the trapezoidal cross sectional shape of each cam groove and the teeth 29a of the male helicoid 29.

As can be understood from the foregoing, the present embodiment of the cam/helicoid barrel 30 is successfully made small while ensuring the strength thereof. However, the present invention is not limited solely to the above-illustrated embodiment. For instance, although the cam/helicoid barrel 30 is designed so that the cam grooves 31 and 32 are formed on the inner peripheral surface of the barrel 30 while the male helicoid 29 is formed on the outer peripheral surface of the barrel 30, it is possible to achieve a similar cam/helicoid barrel provided on the outer and inner peripheral surfaces thereof with cam grooves and a helicoid, respectively. Furthermore, the number of the cam grooves can be one or more than two.

As can be understood from the foregoing, according to the present invention, a cam/helicoid barrel which makes it possible to reduce the size of the zoom lens while maintaining a sufficient strength of the cam/helicoid barrel has been achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A barrel comprising at least one cam groove and a helicoid on one and the other of outer and inner peripheral surfaces of said barrel, respectively;
   wherein a wall thickness of said barrel corresponds to the sum of a height of teeth of said helicoid and a depth of said cam groove, so that said cam groove forms through-holes in the wall of said barrel where no said teeth exist.

2. The barrel according to claim 1, wherein said teeth of said helicoid extend in an inclination direction different to an inclination direction of said cam groove with respect to an axis of said barrel.

3. The barrel according to claim 1, wherein said cam groove is formed so that the width thereof gradually decreases in a radial and outward direction of said barrel.

4. The barrel according to claim 1, wherein a plurality of cam grooves having different profiles constitute said at least one cam groove.

5. The barrel according to claim 1, wherein said teeth of said helicoid are formed integral with said barrel.

6. The barrel according to claim 1, wherein said cam groove and said helicoid are formed on said inner peripheral surface of said barrel and said outer peripheral surface of said barrel, respectively.

7. The barrel according to claim 1, wherein said barrel is provided as an element of a zoom lens.

8. A barrel comprising at least one cam and a helicoid on one and the other of outer and inner peripheral surfaces of said barrel, respectively;
   wherein said cam is formed as a cam slot which forms through-holes in said barrel in a radial direction of said barrel, and
   wherein teeth of said helicoid are connected to said cam slot so as to partly cover an outer opening of said cam slot.

9. A barrel comprising:
   at least one cam groove formed on one of outer and inner peripheral surfaces of said barrel; and
   a helicoid formed on the other of said outer and inner peripheral surfaces of said barrel,
   wherein teeth of said helicoid extend in an inclination direction different to that of said cam groove with respect to an axis of said barrel, and
   wherein said cam groove is formed so as to form through-holes in said barrel where said teeth of said helicoid do not overlap said cam groove.

10. A zoom lens comprising:
    an outer barrel provided on an inner peripheral surface thereof with a female helicoid;
    an inner barrel provided on an outer peripheral surface thereof with a male helicoid, wherein a feed operation is carried out in accordance with the engagement of said male and female helicoids; and
    at least one cam groove formed on an inner peripheral surface of said inner barrel,
    wherein teeth of said male helicoid extend in an inclination direction different to an inclination direction of said cam groove with respect to an axis of said barrel, and
    wherein said cam groove is formed so as to form through-holes in said barrel where teeth of said male helicoid do not overlap said cam groove.

* * * * *